US012640829B2

(12) United States Patent
Oonishi et al.

(10) Patent No.: US 12,640,829 B2
(45) Date of Patent: May 26, 2026

(54) RADIO WAVE PROPAGATION SIMULATION SYSTEM AND METHOD FOR GENERATING RADIO WAVE PROPAGATION MODEL

(71) Applicant: Hitachi, Ltd., Tokyo (JP)

(72) Inventors: Masami Oonishi, Tokyo (JP); Ryosuke Fujiwara, Tokyo (JP); Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 18/572,496

(22) PCT Filed: Jun. 21, 2022

(86) PCT No.: PCT/JP2022/024651
§ 371 (c)(1),
(2) Date: Dec. 20, 2023

(87) PCT Pub. No.: WO2023/276771
PCT Pub. Date: Jan. 5, 2023

(65) Prior Publication Data
US 2024/0235707 A1 Jul. 11, 2024

(30) Foreign Application Priority Data

Jul. 1, 2021 (JP) ................................. 2021-110080

(51) Int. Cl.
*H04W 16/18* (2009.01)
*H04B 17/354* (2015.01)
*H04B 17/391* (2015.01)

(52) U.S. Cl.
CPC ....... *H04B 17/3912* (2015.01); *H04B 17/354* (2015.01); *H04W 16/18* (2013.01)

(58) Field of Classification Search
None
See application file for complete search history.

(56) References Cited

U.S. PATENT DOCUMENTS 5,689,812 A * 11/1997 Takahashi ............ H04B 17/373
703/13
2010/0285753 A1* 11/2010 Foegelle ............ H04B 17/3911
455/67.12
2015/0099473 A1* 4/2015 Szini ...................... H04B 17/00
455/67.12

FOREIGN PATENT DOCUMENTS

JP 2005-072654 A 3/2005
JP 2010-147519 A 7/2010
(Continued)

OTHER PUBLICATIONS

European Patent Office, Extended European Search Report, Application No. 22832919.9, dated Apr. 7, 2025, in 12 pages.
(Continued)

*Primary Examiner* — Anh Vu H Ly
(74) *Attorney, Agent, or Firm* — PROCOPIO, CORY, HARGREAVES & SAVITCH LLP

(57) ABSTRACT

A radio wave propagation simulation system is constituted with a computer including an arithmetic device that executes predetermined arithmetic processing and a storage device connected to the arithmetic device, and includes a model generation unit which generates a radio wave propagation model by the arithmetic processing of the arithmetic device, and the model generation unit generates a plurality of planes that simulate one surface of a structure, defines, as an attribute of each of the planes to be generated, a unit normal vector representing an orientation of each of the planes and generates a radio wave propagation model constituted with the generated planes.

10 Claims, 5 Drawing Sheets

(56)　　　　　　References Cited

FOREIGN PATENT DOCUMENTS

| | | |
|---|---|---|
| JP | 2015-080061 A | 4/2015 |
| WO | 2015/029179 A1 | 3/2015 |

OTHER PUBLICATIONS

Barring, et al., "Factory Radio Design of a 5G Network in Offline Mode", IEEE Access, Multidisciplanary; Rapid Review: Open Access Journal, vol. 9, 2021, dated Feb. 9, 2021, in 16 pages.

International Search Report translation, and Written Opinion received in corresponding International Application No. PCT/JP2022/024651, mailed Aug. 23, 2022, in 6 pages.

Nakagaki, Nodoka et al., "A Study on Radio Propagation Simulation for Smart Meter in Apartment", IEICE Technical Report, RCS2015-235 (Nov. 2015), in 8 pages.

Japanese Patent Office, Office Action, Application No. 2021-110080, dated Nov. 21, 2024, in 8 pages.

\* cited by examiner

RADIO WAVE PROPAGATION SIMULATION SYSTEM AND METHOD FOR GENERATING RADIO WAVE PROPAGATION MODEL

CROSS REFERENCE TO RELATED APPLICATION

This application is a U.S. national phase of PCT/JP2022/024651, filed Jun. 21, 2022, which claims priority to Japanese Patent Application No. 2021-110080 filed on Jul. 1, 2021, the content of which is incorporated herein by reference.

TECHNICAL FIELD

The present invention relates to a radio wave propagation simulation system.

BACKGROUND ART

In recent years, self-sustaining communication using a public communication technology such as Local 5G and Beyond 5G has begun to spread. These communication schemes have an advantage that communication quality can be guaranteed and high security can be achieved as compared with a radio communication scheme such as a wireless LAN which has been used in related art. As an example of a use method utilizing the advantage, there is radio transmission of a control signal of a device in a production site such as a factory and data acquired by a sensor. In such a use form, a mission critical system is introduced, and it is necessary to perform higher-level operation.

In the 5G and the Beyond 5G using a high frequency band, the number of system construction steps for stable operation increases, and a recovery period of communication interruption due to a change in a radio environment increases. It is therefore necessary to appropriately reproduce a radio wave environment in a cyberspace even in a high frequency band.

Background art of the present technical field includes the following prior art. PTL 1 (JP 2005-72654 A) discloses a radio wave propagation simulation device that performs radio wave propagation simulation using a three-dimensional model generated using a mobile body, the device including: a three-dimensional model generation unit which generates a plurality of polygons by generating connection data of points in three-dimensional point cloud data representing each object acquired using the mobile body with a plurality of the points on the basis of a traveling direction of the mobile body and generates a three-dimensional model from the generated plurality of polygons; and a radio wave propagation simulation unit which calculates electric field intensity by geometrically calculating a propagation path of a radio wave reaching a receive point on the basis of the three-dimensional model generated by the three-dimensional model generation unit 20.

Further, PTL 2 (JP 2015-80061 A) discloses a radio network installation design device that generates a numerical model for analysis of a target area and predicts radio wave propagation characteristics of the target area using the numerical model for analysis, the radio network installation design device including: an image processing device which extracts a feature of a structure of the target area from image data obtained by capturing images of the target area from a plurality of directions and imaging conditions of the image data; an analysis numerical model generation device which generates data of the analysis numerical model on the basis of the feature of the structure; and a reception power analysis device which performs electromagnetic field analysis from the data of the analysis numerical model and radio equipment conditions indicating radio wave radiation conditions and installation conditions of radio equipment installed in the target area and calculates reception power of the radio device indicating the radio wave propagation characteristics of the target area.

SUMMARY OF INVENTION

Technical Problem

When a radio environment is simulated using a radio wave propagation model in a cyberspace, a three-dimensional model for ray tracing in related art has no degree of freedom in parameters of meshes constituting a plane and has low reproducibility of actual measured values. In addition, in order to generate a model conforming to actual physical dimensions, it takes much time to generate a plane from a point cloud.

An object of the present invention is to simulate a radio environment with high accuracy using a radio wave propagation model in a cyberspace.

Solution to Problem

A representative example of the invention disclosed in the present application is as follows. In other words, a radio wave propagation simulation system is constituted with a computer including an arithmetic device that executes predetermined arithmetic processing and a storage device connected to the arithmetic device and includes a model generation unit which generates a radio wave propagation model by the arithmetic processing of the arithmetic device, and the model generation unit generates a plurality of planes that simulate one surface of a structure, defines, as an attribute of each of the planes to be generated, a unit normal vector representing an orientation of each of the planes, and generates a radio wave propagation model constituted with the generated planes.

Advantageous Effects of Invention

According to one aspect of the present invention, radio wave propagation simulation accuracy can be improved. Problems, configurations, and effects other than those described above will be clarified by the following description of embodiments, and the like.

DESCRIPTION OF EMBODIMENTS

Figure 1:
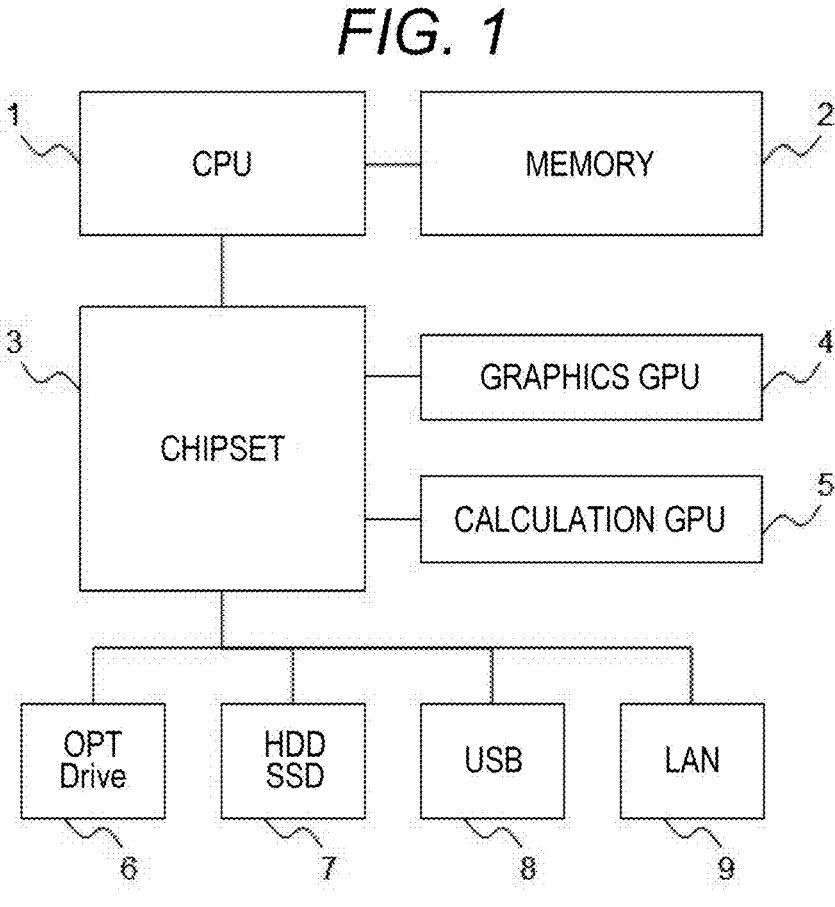
FIG. 1 is a view illustrating a physical configuration of a radio wave propagation simulation system according to an embodiment of the present invention.

FIG. 1 is a view illustrating a physical configuration of a radio wave propagation simulation system according to an embodiment of the present invention.

The radio wave propagation simulation system according to the present embodiment is constituted with a computer including a processor (CPU) 1, a memory 2, a chipset 3, a graphics GPU 4, a calculation GPU 5, an optical disk drive (OPT Drive) 6, an auxiliary storage device (HDD, SSD) 7, an input/output interface (USB) 8, and a communication interface (LAN) 9.

The processor 1 is an arithmetic device that executes a program stored in the memory 2. The processor 1 executes various programs to implement each functional unit (for example, a model generation unit 11, a model optimization unit 12, a simulation unit 13, and the like) of the radio wave propagation simulation system. Note that part of processing to be performed by the processor 1 executing the program may be executed by another arithmetic device (for example, hardware such as ASIC and FPGA).

The memory 2 includes a ROM which is a nonvolatile storage element and a RAM which is a volatile storage element. The ROM stores an invariable program (for example, BIOS), and the like. The RAM is a high-speed and volatile storage element such as a dynamic random access memory (DRAM) and temporarily stores a program to be executed by the processor 1 and data to be used when the program is executed.

The chipset 3 is a circuit constituting a bus that connects components of a computer such as the processor 1 and the memory 2. The graphics GPU 4 and the calculation GPU 5 are processors suitable for image depiction such as three-dimensional graphics and specific calculation processing. The optical disc drive 6 is a device for inputting and outputting data of an optical disc such as a compact disc (CD), a digital versatile disk (DVD), and a Blu-ray disc (BD).

The auxiliary storage device 7 is, for example, a large-capacity nonvolatile storage device such as a magnetic storage device (HDD) or a flash memory (SSD). In addition, the auxiliary storage device 7 stores data (for example, external information 21, measurement information 22, model information 23, and the like) to be used when the processor 1 executes the program and the program to be executed by the processor 1. In other words, the program is read from the auxiliary storage device 7, loaded into the memory 2 and executed by the processor 1, thereby implementing each function of the radio wave propagation simulation system.

The input/output interface 8 is an interface to which an input device such as a keyboard and a mouse and an output device such as a display device and a printer are connected, and which receives an input from an operator and outputs an execution result of a program in a format that can be visually recognized by the operator. Note that a user terminal connected to the radio wave propagation simulation system via a network may provide the input device and the output device. In this case, the radio wave propagation simulation system may have a function of a web server, and the user terminal may access the radio wave propagation simulation system with predetermined protocol (for example, http).

The communication interface 9 is a network interface device that controls communication with other devices according predetermined protocol.

The programs to be executed by the processor 1 and the various GPUs 4 and 5 are provided to the radio wave propagation simulation system via a removable medium (CD-ROM, flash memory, etc.) or a network and stored in the nonvolatile auxiliary storage device 7 which is a non-transitory storage medium. Thus, the radio wave propagation simulation system preferably includes an interface (for example, the optical disk drive 6) that reads data from the removable medium.

The radio wave propagation simulation system is a computer system physically constituted on one computer or constituted on a plurality of logically or physically constituted computers and may operate on a virtual computer constructed on a plurality of physical computer resources. For example, the model generation unit 11, the model optimization unit 12, and the simulation unit 13 may operate on separate physical or logical computers or may operate on one physical or logical computer in combination of a plurality of them.

Figure 2:
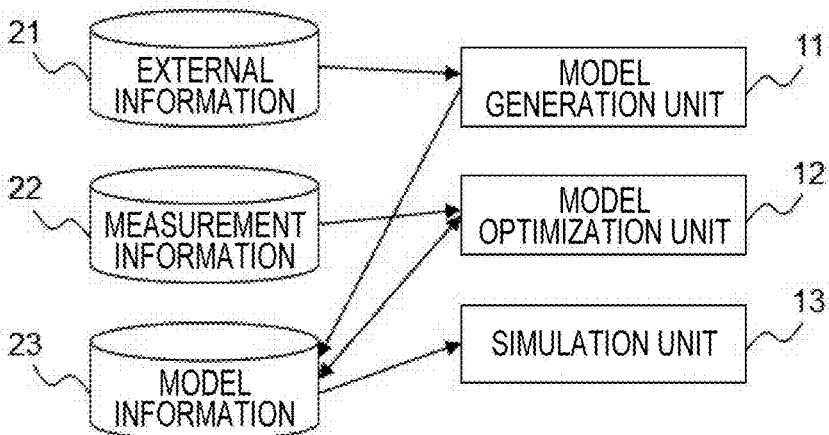
FIG. 2 is a view illustrating a logical configuration of the radio wave propagation simulation system according to the present embodiment.
Figure 3:
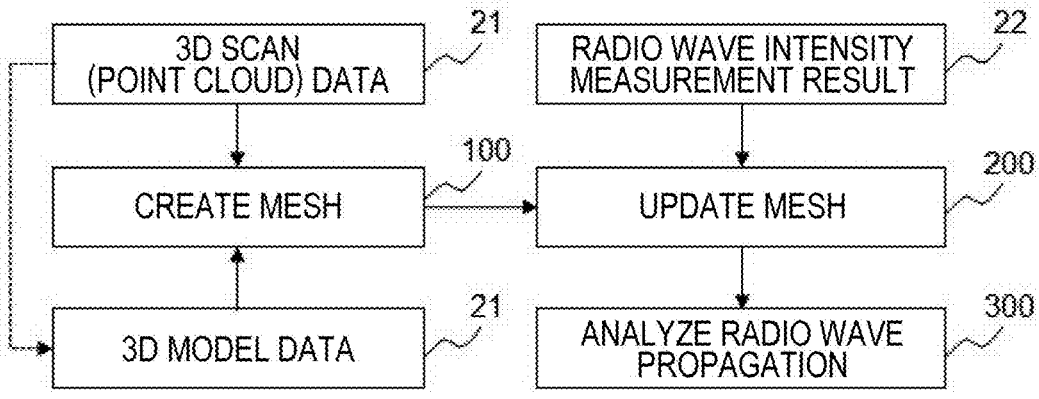
FIG. 3 is a view illustrating entire processing by the radio wave propagation simulation system of the present embodiment.

FIG. 2 is a view illustrating a logical configuration of the radio wave propagation simulation system of the present embodiment, and FIG. 3 is a view illustrating entire processing by the radio wave propagation simulation system of the present embodiment.

The radio wave propagation simulation system of the present embodiment includes the model generation unit 11, the model optimization unit 12, and the simulation unit 13. In addition, the radio wave propagation simulation system stores the external information 21, the measurement information 22, and the model information 23 in the auxiliary storage device 7.

The model generation unit 11 generates a radio wave propagation model represented by a mesh from the three-dimensional data constituting the external information 21 and stores the model as the model information 23 (100). The radio wave propagation model is a three-dimensional model, and a surface of the structure is constituted by a mesh that includes planes divided into a predetermined size. The shape of the mesh may be the quadrangle illustrated in FIG. 5 or the triangle illustrated in FIG. 6. The model optimization unit 12 updates the radio wave propagation model generated by the model generation unit 11 using the measurement information 22 that is an actual electromagnetic field measurement result (200). The simulation unit 13 is a simulator that analyzes radio wave propagation in a space using the updated radio wave propagation model (300).

The external information 21 includes three-dimensional data representing a shape of a space in which radio wave propagation simulation is to be performed and data of a frequency (wavelength) at which the simulation or electromagnetic field measurement is to be performed. The three-dimensional data is point cloud data obtained by three-dimensional scanning by a laser sensor such as LiDAR, a distance image captured by a stereo camera and including distance information, or three-dimensional model data generated from CAD data. The plane data may be three-dimensional model data generated from the point cloud data. The measurement information 22 is an actual electromagnetic field measurement result in a space in which radio wave propagation simulation is to be performed. The model information 23 is a radio wave propagation model generated by the model generation unit 11 and updated by the model optimization unit 12.

Figure 4:
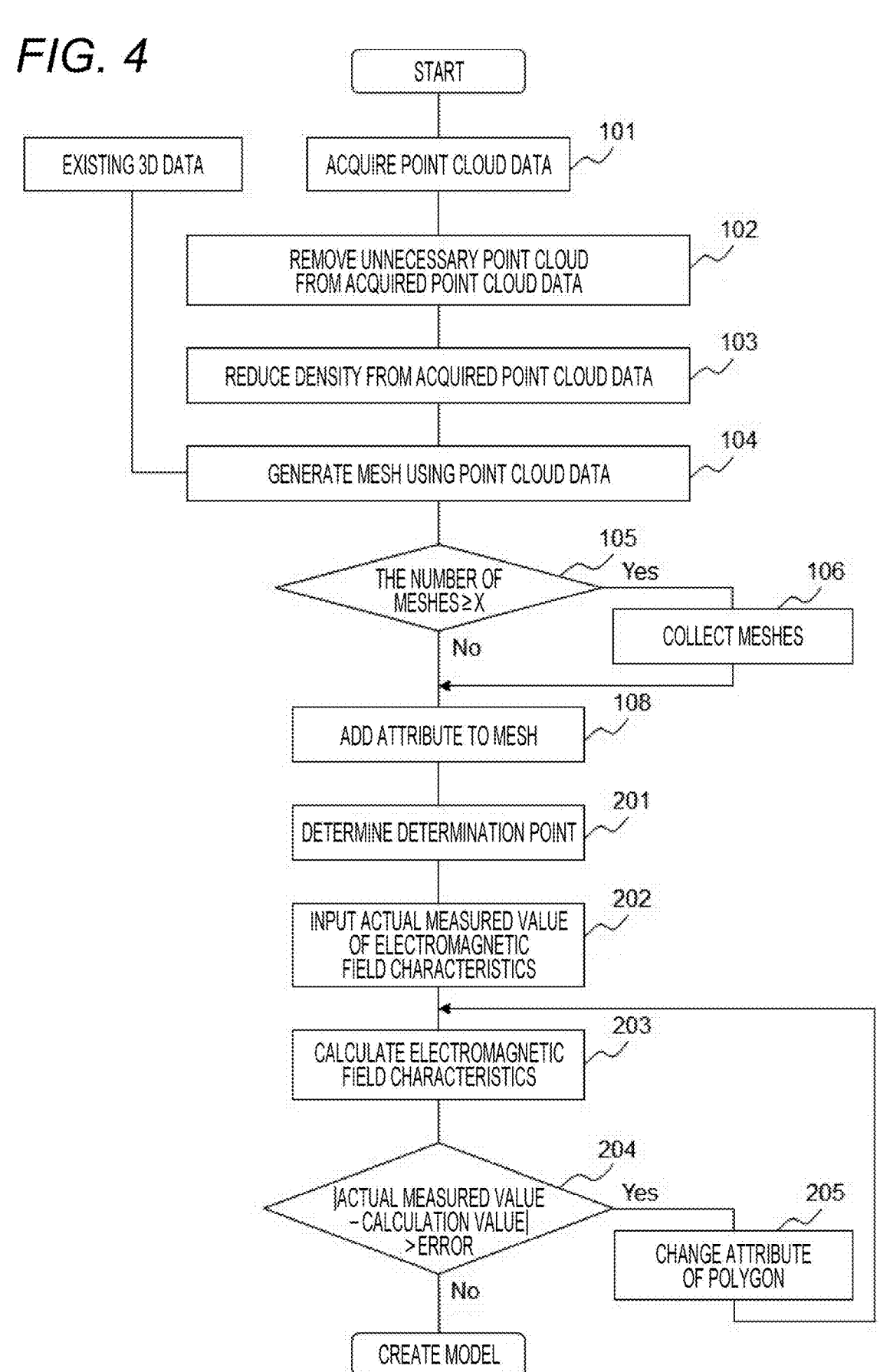
FIG. 4 is a flowchart of processing by the radio wave propagation simulation system of the present embodiment.

FIG. 4 is a flowchart of processing by the radio wave propagation simulation system according to the present embodiment.

First, the model generation unit 11 acquires point cloud data from the external information 21 (101). Then, the model generation unit 11 removes an unnecessary point cloud (for example, noise whose position is greatly shifted) from the acquired point cloud data (102) and reduces density from the acquired point cloud data (103). The point cloud data acquired by the laser sensor such as LiDAR is generally dense, and thus, the point cloud data is reduced to the number necessary and sufficient for radio wave propagation simulation from the viewpoint of effective use of computer resources. The mesh is desirably about ¼ wavelength of the radio wave for which the radio wave propagation simulation is to be performed. Thus, an area of one mesh is preferably set to an area of a square with one side having a ¼ wavelength, and a size of the mesh may be determined in a predetermined range (for example, ±10%) that is equivalent to the area of the square having a ¼ wavelength. The plane of the mesh is determined by three points, and thus, it is preferable to thin out the points so that three points are included in a square range with one side having a ¼ wavelength. In this event, as the remaining three points, it is preferable to select points as far away as possible in the mesh. In addition, the points may be thinned out such that one point is included in one mesh. In this case, it is preferable to determine a position of the mesh by the position of the point and determine a direction of the mesh by a relationship with the adjacent mesh. In addition, the points may be thinned out so that four or more points are included in one mesh.

Thereafter, the model generation unit 11 generates a mesh using the point cloud data whose density is reduced (104). The surface of the three-dimensional model may be divided using existing three-dimensional model data to generate a mesh. The model generation unit 11 determines whether the number of generated meshes is equal to or larger than a predetermined number X (105). As a result, if the number of generated meshes is equal to or larger than the predetermined number X, the model generation unit 11 groups the meshes so that the number of meshes is equal to or smaller than X (106). For example, the number of meshes that can be processed in one simulation is limited in relation to calculation end time. Thus, a new mesh is generated by collecting a plurality of meshes.

Thereafter, the model generation unit 11 assigns an attribute to the generated mesh (108). The attribute of the mesh includes a direction of the plane defined by the normal (unit vector indicating the normal direction), an area of the mesh, and a position of the mesh. The position of the mesh is determined in three directions of orthogonal XYZ (front and back, left and right, up and down). Note that the meshes overlap or a gap is generated between the meshes due to movement of the position of the mesh. However, a change in the position of the mesh may be restricted by determining a tolerance of the overlap or a maximum value of the allowable gap. Note that the attribute of the mesh may include a material of the mesh. If the material of the mesh is determined, reflectance of a radio wave of the mesh is determined. The reflectance of the radio wave varies depending on the material, and a result of the radio wave propagation simulation varies. An initial value is preferably set to the material of the mesh, and the initial value may be updated with data designated by the user or acquired from CAD data. These attributes may be collectively recorded in a multi-dimensional normal vector to which a direction, an area, a position, and a material are assigned.

Figures 7, 8:
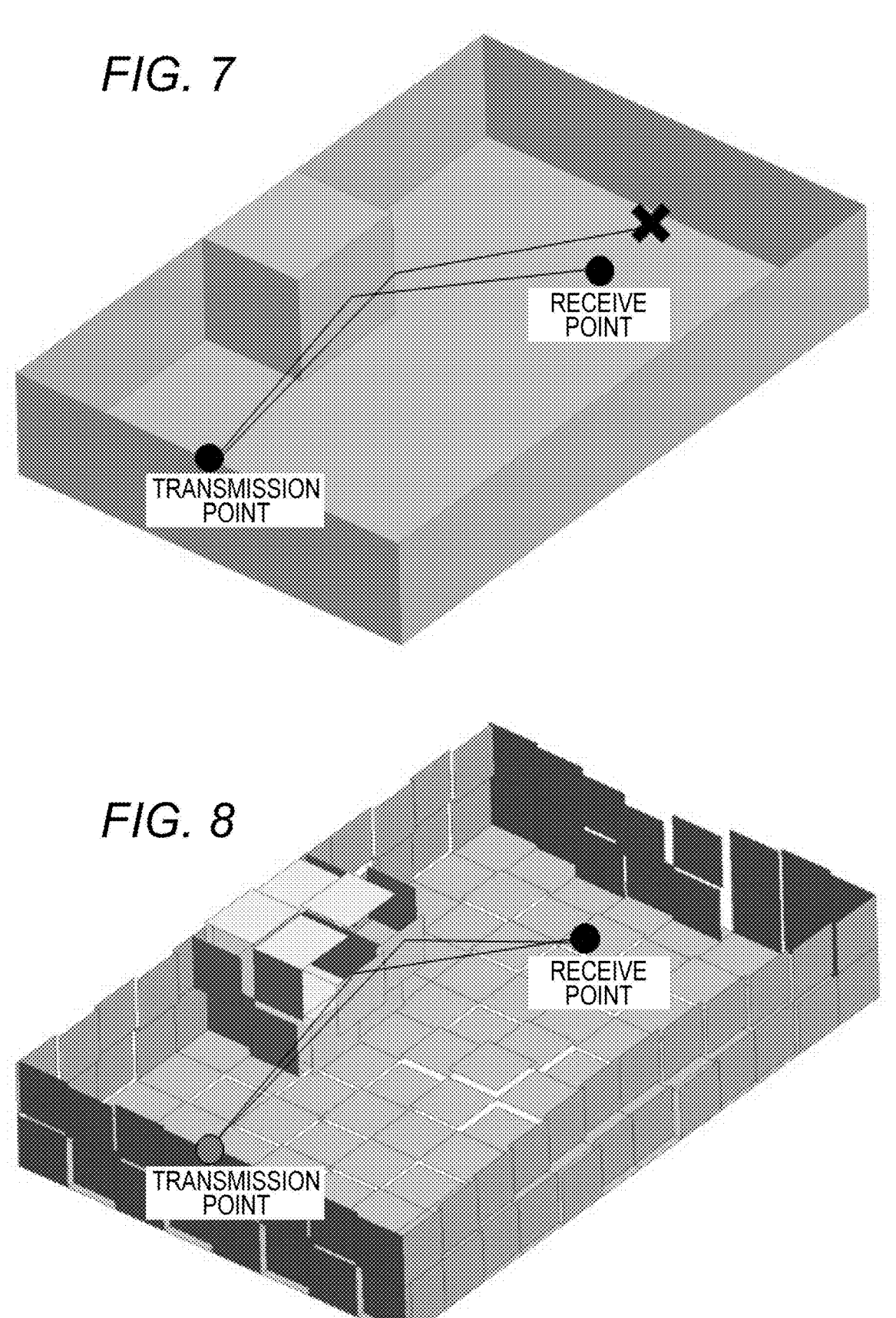
FIG. 7 is a view illustrating radio wave propagation simulation according to a radio wave propagation model in related art.
FIG. 8 is a view illustrating radio wave propagation simulation by the radio wave propagation model of the present embodiment.

Thereafter, the model optimization unit 12 receives an input of a position of a measurement point at which electromagnetic field measurement is to be performed and determines a determination point at which actual measured data is to be compared with a mesh (201). Thereafter, the model optimization unit 12 receives an input of an actual measured value of the electromagnetic field characteristics (202) and calculates the electromagnetic field characteristics using the generated radio wave propagation model (203). For example, as illustrated in FIG. 8, when a radio wave is emitted from one or a plurality of predetermined transmission points, the electric field intensity at one or a plurality of receive points is calculated. Then, the model optimization unit 12 determines whether a difference between the input actual measured value and the calculation value is larger than a predetermined error (204). If the difference between the actual measured value and the calculation value is larger than the predetermined error, the attribute (direction, area, position, material) of each mesh is changed (205), and the processing returns to step 203 to recalculate the electromagnetic field characteristics. For example, a traveling direction of the reflected wave is changed by changing the direction, area, and position of each mesh, and intensity of the reflected wave is changed by changing the material.

On the other hand, if the difference between the actual measured value and the calculation value is equal to or less than the predetermined error, the radio wave propagation model is completed. In the optimization processing of steps 203 to 205, the attribute of each mesh having a minimum error may be calculated by multivariate analysis such as multiple regression analysis.

Thereafter, radio wave propagation simulation is performed using the completed radio wave propagation model. In the radio wave propagation simulation using the radio wave propagation model of the present embodiment, simulation is performed without considering reflection and diffraction due to gaps between meshes.

Figure 5:
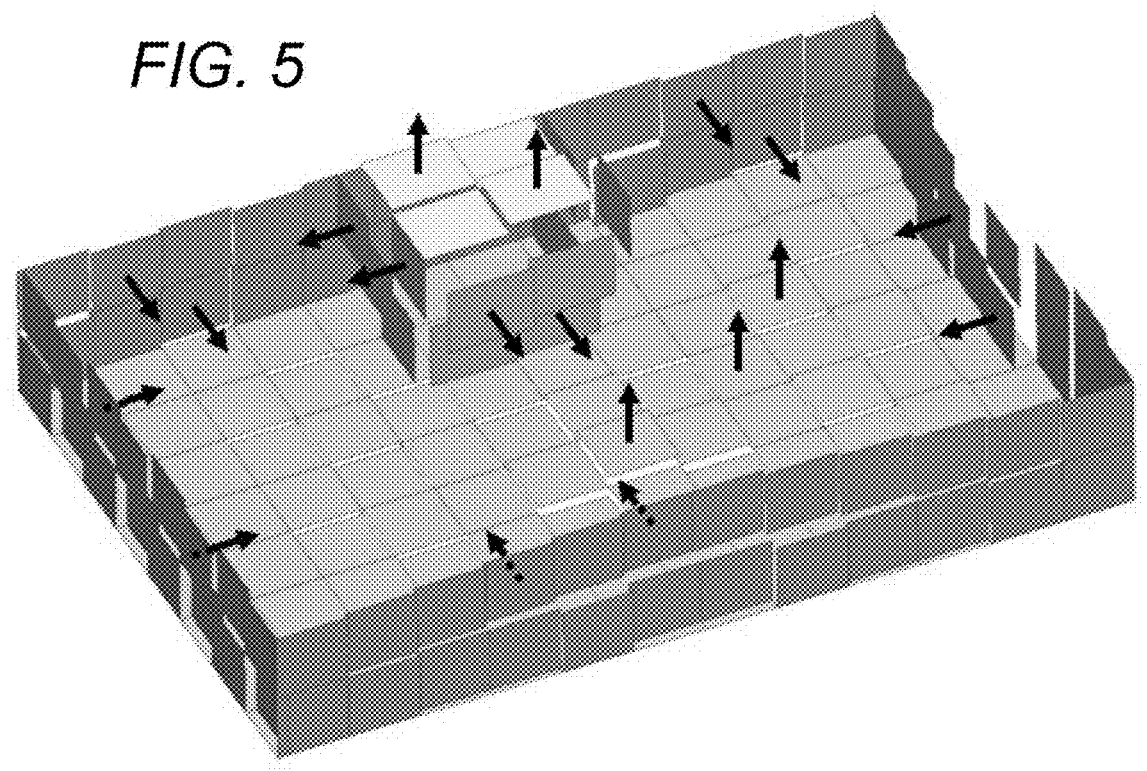
FIG. 5 is a view illustrating a radio wave propagation model of the present embodiment.
Figure 6:
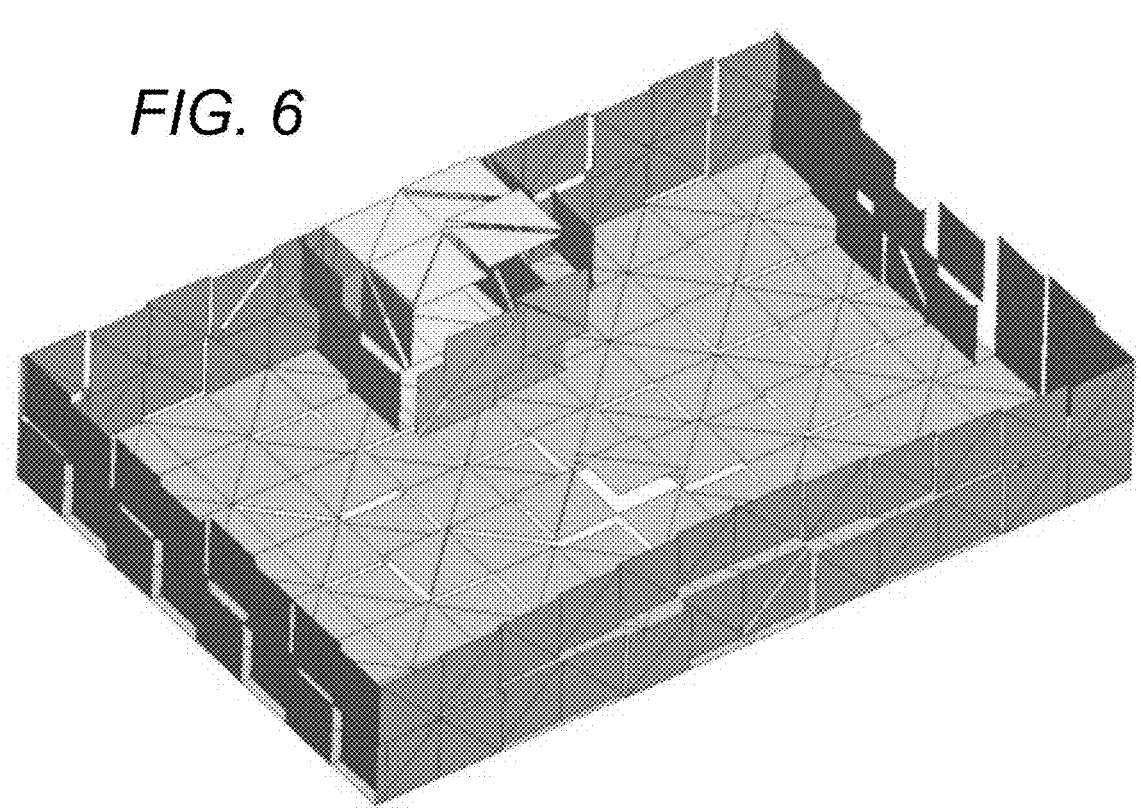
FIG. 6 is a view illustrating the radio wave propagation model of the present embodiment.

FIGS. 5 and 6 are views illustrating the radio wave propagation model generated by the radio wave propagation simulation system according to the present embodiment, FIG. 7 is a view illustrating radio wave propagation simulation according to the radio wave propagation model in related art, and FIG. 8 is a view illustrating radio wave propagation simulation according to the radio wave propagation model according to the present embodiment.

The mesh forming the radio wave propagation model may be a quadrangle illustrated in FIG. 5 or a triangle illustrated in FIG. 6. Each mesh is determined by the position, the orientation of the plane (normal direction), and the area. A material (that is, reflectance) may be defined for each mesh.

In addition, as illustrated in FIGS. 5 and 6, sides do not have to be shared by adjacent meshes, that is, there may be a gap between adjacent meshes. As illustrated in FIG. 7, the radio wave propagation model in related art is formed by a continuous plane that is not divided into meshes or has no gap between adjacent meshes. On the other hand, as illustrated in FIG. 8, the radio wave propagation model of the present embodiment is formed by discontinuous planes divided into meshes. Thus, in the radio wave propagation model in related art, an arrival point is different if the radio wave emitted from one transmission point is reflected at different places. However, in the radio wave propagation model of the present embodiment, even if the radio wave emitted from one transmission point is reflected by different meshes, the radio wave reaches the same receive point. Thus, radio wave propagation simulation can be performed in consideration of the influence of multipath, reproduction accuracy of the measured value can be improved, and simulation accuracy can be improved.

In addition, accuracy of the radio wave propagation model is improved by the optimization processing, and thus, the initial model may have low accuracy, and it is not necessary to manually generate a high-accuracy model.

In addition, the radio wave propagation model is generated using the point cloud data measured by the laser sensor, and thus, the radio wave propagation model can be generated in a short period, and appropriate radio wave propagation simulation can be performed in a short period not only when the network is designed but also when a communication failure occurs during operation.

Although the radio wave propagation simulation in outdoors has been described as an example in the embodiment of the present invention, the present invention can be applied to various places such as outdoors and a mine tunnel.

In addition, the embodiment of the present invention has been described using radio wave propagation simulation as an example, but the present invention can also be applied to propagation simulation of sound and light.

As described above, according to the embodiment of the present invention, it is possible to improve radio wave propagation simulation accuracy using a radio wave propagation model in a cyberspace. Thus, in the 5G or the Beyond 5G using a high frequency band, it is possible to reduce the number of system construction steps for stable operation, and it is possible to shorten a recovery period of communication interruption due to a change in a radio environment.

Note that the present invention is not limited to the above-described embodiment and includes various modifications and equivalent configurations within the spirit of the appended claims. For example, the above-described embodiment has been described in detail for easy understanding of the present invention, and the present invention is not necessarily limited to those having all the described components. Further, part of the components of one embodiment may be replaced with the components of another embodiment. In addition, the components of another embodiment may be added to the components of a certain embodiment. In addition, it is possible to make addition, deletion, and replacement concerning part of the components of each embodiment.

In addition, part or all of each of the above-described components, functions, processing units, processing means, and the like, may be implemented by hardware, for example, by designing with an integrated circuit or may be implemented by software, by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, and a DVD.

In addition, control lines and information lines indicate what is considered to be necessary for the description, and not all the control lines and information lines necessary for implementation are necessarily indicated. In practice, it may be considered that almost all the components are connected to each other.

The invention claimed is:

1. A radio wave propagation simulation system constituted with a computer including an arithmetic device that executes predetermined arithmetic processing and a storage device connected to the arithmetic device, the radio wave propagation simulation system comprising a model generation unit which generates a radio wave propagation model by the arithmetic processing of the arithmetic device, wherein the model generation unit generates a plurality of planes that simulate one surface of a structure, defines, as an attribute of each of the planes to be generated, a unit normal vector representing an orientation of each of the planes, and generates a radio wave propagation model constituted with the generated planes.

2. The radio wave propagation simulation system according to claim 1, wherein the model generation unit determines an area of each of the plurality of planes constituting the radio wave propagation model to be smaller than a predetermined area as an attribute of each of the planes.

3. The radio wave propagation simulation system according to claim 2, wherein the model generation unit defines an area of each of the plurality of planes constituting the radio wave propagation model as an attribute of each of the planes such that an area of each of the planes is smaller than an area of a square with one side having a wavelength of $\lambda/4$, where a wavelength of a radio wave to be used in simulation is $\lambda$.

4. The radio wave propagation simulation system according to claim 2, wherein the model generation unit determines a position of each of the plurality of planes constituting the radio wave propagation model as an attribute of each of the planes.

5. The radio wave propagation simulation system according to claim 4, wherein the model generation unit determines reflectance of each of the plurality of planes constituting the radio wave propagation model as an attribute of each of the planes.

6. The radio wave propagation simulation system according to claim 1, wherein the model generation unit generates a plurality of planes constituting the radio wave propagation model from point cloud data measured in a space in which simulation is to be performed.

7. The radio wave propagation simulation system according to claim 1, wherein the model generation unit generates a plurality of planes constituting the radio wave propagation model from shape data of a space in which simulation is to be performed.

8. The radio wave propagation simulation system according to claim 1, further comprising a model optimization unit which updates the generated radio wave propagation model using an actual electromagnetic field measurement result, wherein the model optimization unit calculates electromagnetic field characteristics using the generated radio wave propagation model, and updates the radio wave propagation model by changing an attribute of each of the plurality of planes constituting the radio wave propagation model such that a difference between the actual electromagnetic field measurement result and a calculation result of the electromagnetic field characteristics becomes small.

9. A method for generating a radio wave propagation model to be executed by a radio wave propagation simulation system, the radio wave propagation simulation system being constituted with a computer including an arithmetic device that executes predetermined arithmetic processing and a storage device connected to the arithmetic device, the method for generating the radio wave propagation model comprising:

the arithmetic device generating a plurality of planes by dividing one surface of a structure;

the arithmetic device defining, as an attribute of each of the planes to be generated, a unit normal vector representing an orientation of each of the planes; and the arithmetic device generating a radio wave propagation model constituted with the generated planes.

10. The method for generating a radio wave propagation model according to claim 9, wherein the arithmetic device calculates electromagnetic field characteristics using the generated radio wave propagation model, and the arithmetic device updates the radio wave propagation model by changing an attribute of each of the plurality of planes constituting the radio wave propagation model such that a difference between an actual electromagnetic field measurement result and a calculation result of the electromagnetic field characteristics becomes small.

\* \* \* \* \*